(12) United States Patent
Wei (10) Patent No.: US 12,395,876 B2
(45) Date of Patent: Aug. 19, 2025

(54) METHOD OF INTER-CELL COORDINATION FOR INTELLIGENT REFLECTING SURFACE ASSISTED WIRELESS NETWORK AND COMMUNICATION DEVICE USING THE SAME

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 708 days.

(21) Appl. No.: 17/687,686

(22) Filed: Mar. 7, 2022

(65) Prior Publication Data

US 2023/0284055 A1 Sep. 7, 2023

(51) Int. Cl.
| | | |
|---|---|---|
| H04B 7/04 | (2017.01) | |
| H04B 17/20 | (2015.01) | |
| H04B 17/345 | (2015.01) | |
| H04B 17/40 | (2015.01) | |
| H04L 5/00 | (2006.01) | |
| H04W 24/08 | (2009.01) | |
| H04W 24/10 | (2009.01) | |
| H04W 84/02 | (2009.01) | |
| H04W 88/02 | (2009.01) | |

(Continued)

(52) U.S. Cl.
CPC ........ *H04W 24/10* (2013.01); *H04B 7/04013* (2023.05); *H04B 17/252* (2023.05); *H04B 17/345* (2015.01); *H04B 17/40* (2015.01); *H04L 5/0035* (2013.01); *H04L 5/0073* (2013.01); *H04W 24/08* (2013.01); *H04W 84/02* (2013.01); *H04W 88/02* (2013.01); *H04W 88/085* (2013.01); *H04W 92/02* (2013.01); *H04W 92/10* (2013.01)

(58) Field of Classification Search
CPC .... H04B 7/02–17; H04B 17/0082–409; H04L 5/0001–26; H04W 8/22–245; H04W 24/02–10; H04W 28/02–26; H04W 36/0005–385; H04W 40/005–38; H04W 48/02–20; H04W 72/02–569; H04W 76/10–50; H04W 84/005–22; H04W 88/005–188; H04W 92/02–24
See application file for complete search history.

(56) References Cited

U.S. PATENT DOCUMENTS

| | | | |
|---|---|---|---|
| 2021/0337617 A1 | 10/2021 | Bao et al. | |
| 2023/0189021 A1* | 6/2023 | Ali | H04B 7/04013 |
| 2023/0327714 A1* | 10/2023 | Baligh | H04B 7/04013 |

FOREIGN PATENT DOCUMENTS

| | | |
|---|---|---|
| CN | 113133014 | 7/2021 |
| CN | 113949985 | 1/2022 |

(Continued)

*Primary Examiner* — Timothy J Weidner
(74) *Attorney, Agent, or Firm* — JCIPRNET (57) ABSTRACT

A method of inter-cell coordination for intelligent reflecting surface (IRS) assisted wireless network is provided. The method includes: receiving mode information corresponding to a first intelligent reflecting surface and a second intelligent reflecting surface; performing a channel measurement according to the mode information to generate a measurement report; transmitting the measurement report to a serving base station; and performing data transmission via the first intelligent reflecting surface and the second intelligent reflecting surface configured according to the measurement report.

6 Claims, 8 Drawing Sheets

(51) Int. Cl.
*H04W 88/08* (2009.01)
*H04W 92/02* (2009.01)
*H04W 92/10* (2009.01)

(56) References Cited

FOREIGN PATENT DOCUMENTS

| | | |
|---|---|---|
| CN | 113993180 | 1/2022 |
| CN | 114080036 | 2/2022 |
| CN | 114142898 | 3/2022 |
| WO | 2021221603 | 11/2021 |

* cited by examiner

METHOD OF INTER-CELL COORDINATION FOR INTELLIGENT REFLECTING SURFACE ASSISTED WIRELESS NETWORK AND COMMUNICATION DEVICE USING THE SAME

BACKGROUND

Technical Field

The present disclosure relates to the field of wireless communication, and more particularly, to a method of inter-cell coordination for intelligent reflecting surface assisted wireless network, a user equipment (UE), and a base station (BS).

Description of Related Art

Figure 1:
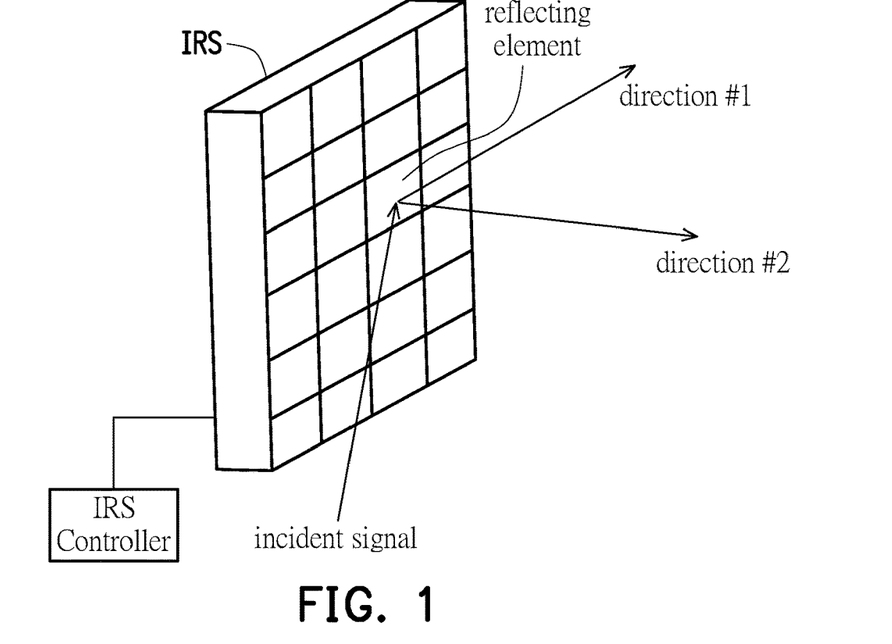
FIG. 1 illustrates a schematic diagram of IRS.

Intelligent reflecting surface (IRS) is considered as a key enabling technology for future wireless networks (e.g., 5G, beyond 5G, or 6G). An IRS may be implemented by a control circuit board, a copper backplane, and a plurality of reflecting elements and may be controlled by an IRS controller, as shown in FIG. 1. A reflecting element may comprise one or more meta-atoms. In order to improve the performance of wireless communication, the IRS controller may configure or reconfigure the IRS with different electronic signals so as to change the reflecting characteristics of the reflecting elements. Accordingly, the reflecting element may reflect incident signal to different directions (e.g., direction #1 or direction #2 in FIG. 1).

Signal reception and interference for the UE in the cell boundary are critical for wireless system operation performance. With inter-cell coordination of IRSs, performance of the cell-edge UE may be improved. Therefore, how to configure multiple IRSs to perform inter-cell coordination is an important issue to the field.

SUMMARY

The present disclosure is directed to a method of inter-cell coordination for intelligent reflecting surface assisted wireless network, a UE, and a base station.

A method of inter-cell coordination for intelligent reflecting surface assisted wireless network, adapted to a user equipment, comprising: receiving mode information corresponding to a first intelligent reflecting surface and a second intelligent reflecting surface; performing a channel measurement according to the mode information to generate a measurement report; transmitting the measurement report to a serving base station; and performing data transmission via the first intelligent reflecting surface and the second intelligent reflecting surface configured according to the measurement report.

In one embodiment, the measurement report comprises at least one of the followings: a first preference operation mode of the first intelligent reflecting surface, wherein the first intelligent reflecting surface is controlled by the serving base station; a second preference operation mode of the second intelligent reflecting surface, wherein the second intelligent reflecting surface is controlled by a neighboring base station; a preference coordinated scheduling of the serving base station controlling the first intelligent reflecting surface and the neighboring base station controlling the second intelligent reflecting surface; a first measurement result of a first channel between the user equipment and the first intelligent reflecting surface; and a second measurement result of a second channel between the user equipment and the second intelligent reflecting surface.

In one embodiment, the mode information comprises at least one of the followings: a first operation mode of the first intelligent reflecting surface; a second operation mode of the second intelligent reflecting surface; a coordinated scheduling of the serving base station corresponding to the first intelligent reflecting surface and a neighboring base station corresponding to the second intelligent reflecting surface; a list of operation modes supported by the serving base station or the neighboring base station; and a time and frequency of radio resource of a reference signal for performing the channel measurement.

In one embodiment, the method further comprising: in response to detecting interference caused by a first neighboring base station corresponding to the second intelligent reflecting surface, determining to transmit the measurement report; and in response to a measurement result of the channel measurement being less than a threshold, determining to transmit the measurement report.

In one embodiment, the measurement result is associated with a communication reliability, wherein a preference coordinated scheduling in the measurement report suggests that the serving base station controlling the first intelligent reflecting surface and a second neighboring base station controlling the second intelligent reflecting surface perform the data transmission with the user equipment respectively by using the same data packets.

In one embodiment, the measurement result is associated with a communication data rate, wherein a preference coordinated scheduling in the measurement report suggests that the serving base station controlling the first intelligent reflecting surface and a second neighboring base station controlling the second intelligent reflecting surface perform the data transmission with the user equipment respectively by using different data packets.

In one embodiment, the mode information is received from one of the serving base station controlling the first intelligent reflecting surface and a neighboring base station controlling the second intelligent reflecting surface.

A method of inter-cell coordination for intelligent reflecting surface assisted wireless network, adapted to a user equipment, comprising: transmitting a sounding reference signal to a serving base station controlling a first intelligent reflecting surface and a neighboring base station controlling a second intelligent reflecting surface; and performing data transmission via the first intelligent reflecting surface and the second intelligent reflecting surface configured according to the sounding reference signal.

In one embodiment, the step of performing the data transmission via the first intelligent reflecting surface and the second intelligent reflecting surface configured according to the sounding reference signal comprising: performing the data transmission with the first intelligent reflecting surface and the second intelligent reflecting surface respectively by using the same data packets.

In one embodiment, the step of performing the data transmission via the first intelligent reflecting surface and the second intelligent reflecting surface configured according to the sounding reference signal comprising: performing the data transmission with the first intelligent reflecting surface and the second intelligent reflecting surface respectively by using different data packets.

In one embodiment, the method further comprising: receiving a sounding measurement configuration for transmitting the sounding reference signal, wherein the sounding measurement configuration corresponds to at least one of the first intelligent reflecting surface and the second intelligent reflecting surface.

In one embodiment, the sounding measurement configuration comprises at least one of the followings: a first operation mode of to the first intelligent reflecting surface; a second operation mode of to the second intelligent reflecting surface; and a time and frequency of radio resource for transmitting the sound reference signal.

In one embodiment, the step of transmitting the sounding reference signal to the serving base station controlling the first intelligent reflecting surface and the neighboring base station controlling the second intelligent reflecting surface comprising one of the followings: transmitting the sounding reference signal by a one-time action according to the time and frequency of radio resource; transmitting the sounding reference signal periodically according to the time and frequency of radio resource; and transmitting the sounding reference signal semi-persistently according to the sounding measurement configuration.

In one embodiment, the sounding measurement configuration is received from one of the serving base station and the neighboring base station.

A method of inter-cell coordination for intelligent reflecting surface assisted wireless network, adapted to a base station, comprising: receiving, from a user equipment, a measurement report associated with a first intelligent reflecting surface controlled by the base station and a second intelligent reflecting surface controlled by a neighboring base station; configuring the first intelligent reflecting surface according to the measurement report; and transmitting a coordination configuration to the neighboring base station according to the measurement report.

In one embodiment, the coordination configuration comprises at least one of the followings: a suggested operation mode of the second intelligent reflecting surface; a suggested coordinated scheduling of the base station and the neighboring base station; and the measurement report.

In one embodiment, the suggested coordinated scheduling suggests that the base station and the neighboring base station perform data transmission with the user equipment respectively by using the same data packet.

In one embodiment, the suggested coordinated scheduling suggests that the base station and the neighboring base station perform data transmission with the user equipment respectively by using different data packets, wherein the method further comprising: performing a joint decoding on the different data packets to obtain a decoded data stream; and transmitting the decoded data stream to a core network.

In one embodiment, the method further comprising: transmitting mode information to the user equipment to obtain the measurement report, wherein the mode information comprises at least one of the followings: a first operation mode of to the first intelligent reflecting surface; a second operation mode of the second intelligent reflecting surface; a coordinated scheduling of the base station and the neighboring base station; a list of operation mode supported by the base station or the neighboring base station; and a time and frequency of radio resource of a reference signal for generating the measurement report.

In one embodiment, the step of transmitting the mode information to the user equipment to obtain the measurement report comprising one of the followings: transmitting the mode information in response to receiving a request; and transmitting the mode information periodically.

In one embodiment, the step of configuring the first intelligent reflecting surface according to the measurement report comprising: enhancing quality of a signal transmitted between the user equipment and the first intelligent reflecting surface.

In one embodiment, the step of configuring the first intelligent reflecting surface according to the measurement report comprising: degrading quality of a signal transmitted between the user equipment and the first intelligent reflecting surface.

In one embodiment, the step of degrading the quality of the signal transmitted between the user equipment and the first intelligent reflecting surface comprising: maximizing a ratio of a second quality of a second signal to the quality, wherein the second signal is transmitted between the base station and a second user equipment.

In one embodiment, the measurement report comprises one of the followings: a first preference operation mode of the first intelligent reflecting surface; a second preference operation mode of the second intelligent reflecting surface; a preference coordinated scheduling of the base station and the neighboring base station; a first measurement result of a first channel between the user equipment and the first intelligent reflecting surface; and a second measurement result of a second channel between the user equipment and the second intelligent reflecting surface.

A method of inter-cell coordination for intelligent reflecting surface assisted wireless network, adapted to a base station, comprising: obtaining a first measurement report corresponding to the base station and a second measurement report corresponding to a neighboring base station, wherein the base station controls a first intelligent reflecting surface and the neighboring base station controls a second intelligent reflecting surface; configuring the first intelligent reflecting surface according to the first measurement report and the second measurement report; and transmitting a coordination configuration to the neighboring base station according to the first measurement report and the second measurement report.

In one embodiment, the coordination configuration comprises at least one of the followings: a suggested operation mode of the second intelligent reflecting surface; and a suggested coordinated scheduling of the base station and the neighboring base station.

In one embodiment, the suggested coordinated scheduling suggests that the base station and the neighboring base station perform data transmission with the user equipment respectively by using the same data packets.

In one embodiment, the suggested coordinated scheduling suggests that the base station and the neighboring base station perform data transmission with the user equipment respectively by using different data packets, wherein the method further comprising: performing a joint decoding on the different data packets to obtain a decoded data stream; and transmitting the decoded data stream to a core network.

In one embodiment, the step of configuring the first intelligent reflecting surface according to the first measurement report and the second measurement report comprising: enhancing quality of a signal transmitted between the user equipment and the first intelligent reflecting surface.

In one embodiment, the step of configuring the first intelligent reflecting surface according to the first measurement report and the second measurement report comprising: degrading quality of a signal transmitted between the user equipment and the first intelligent reflecting surface.

In one embodiment, the step of degrading the quality of the signal transmitted between the user equipment and the first intelligent reflecting surface comprising: maximizing a ratio of a second quality of a second signal to the quality, wherein the second signal is transmitted between the base station and a second user equipment.

In one embodiment, the second measurement report comprises at least one of the followings: a preference operation mode of the second intelligent reflecting surface; a preference coordinated scheduling of the base station and the neighboring base station; and a measurement result of a channel between the user equipment and the second intelligent reflecting surface.

In one embodiment, the method further comprising: transmitting a sounding measurement configuration; receiving a sounding reference signal corresponding to the sounding measurement configuration; and performing a channel measurement according to the sounding reference signal to obtain the first measurement report.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

To further describe the content of the disclosure, embodiments are described below as examples based on which the disclosure may be implemented. In addition, wherever possible, the elements/components/steps with denoted by the same reference numeral in the drawings and embodiments are represent the same or similar parts.

A communication system for IRS assisted wireless network may include one or more UEs, base stations (or cells), and IRSs. The base station may include, for example, a gNB, an eNB, a node B, a home eNB, a macro BS, or a pico BS, wherein the UE may include, for example, a wireless device, a mobile node (MN), an Internet of Things (IoT) device, a mobile station (MS), or a subscriber station (SS). An IRS may include an IRS controller, a meta surface having a plurality of reflecting elements, a control circuit board coupled to the IRS controller, and a copper backplane connecting the control circuit board to the meta surface. The IRS controller may include a wireless transceiver for receiving or transmitting signaling for operation and/or configuration of the IRS. The IRS controller may include a microprocessor, a FPGA, or an ASIC. A reflecting element may include a plurality of meta atoms, wherein each of the reflecting element or the meta atom may be implemented by positive-intrinsic-negative (PIN) nodes, field-effect transistors (FETs), micro-electromechanical system (MEMS) switch, or a tunable chip.

IRS may operate in different IRS operation modes. In one embodiment, the IRS operation mode of the IRS may be static. For example, a base station may transmit a command to the IRS, wherein the command may include a set of operation parameters for IRS. The IRS may operate in the IRS operation mode corresponding to the set of operation parameters. In one embodiment, the IRS operation mode of the IRS may be a dynamic pattern, wherein the UE may receive the dynamic pattern from a base station. The dynamic pattern may include a plurality of IRS operation modes and a plurality of time periods respectively corresponding to the IRS operation modes. The IRS may operate in a specific IRS operation mode during a time period corresponding to the specific IRS operation mode according to the dynamic pattern.

The present disclosure provides a wireless communication mechanism suitable for wireless system with multiple base stations and multiple IRSs. It is assumed that each of the multiple IRSs is control by a corresponding base station.

Figure 2:
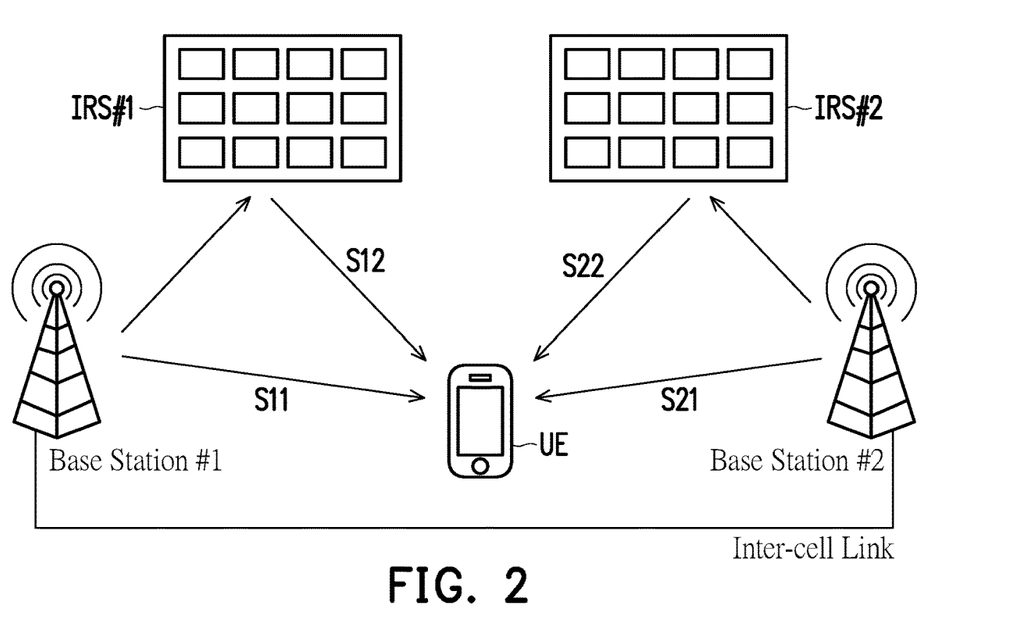
FIG. 2 illustrates a schematic diagram of an inter-cell IRS operation coordination through an inter-cell link according to one exemplary embodiment of the present disclosure.

To achieve reliability enhancement, a joint transmission may be performed by multiple base station. FIG. 2 illustrates a schematic diagram of an inter-cell IRS operation coordination through an inter-cell link according to one exemplary embodiment of the present disclosure. A UE is in the cell boundary corresponding to base station #1 and base station #2, wherein base station #2 is a neighboring base station of base station #1. IRS #1 may be controlled by base station #1 and IRS #2 may be controlled by base station #2. Base station #1 may transmit a signal to the UE. The signal may propagate directly to the UE (e.g., through path S11) and/or may be reflected to the UE via IRS #1 (e.g., through path S12). Base station #1 may configure the IRS operation mode of IRS #1 to enhance the quality of the signal on path S12. On the other hand, base station #2 may transmit another signal to the UE. The signal may propagate directly to the UE (e.g., through path S21) and/or may be reflected to the UE via IRS #2 (e.g., through path S22). Base station #2 may configure the IRS operation mode of IRS #2 to enhance the quality of the signal on path S22. The quality of the signal may be associated with, for example, a reference symbol received power (RSRP), a received signal strength indication (RSSI), a reference signal received quality (RSRQ), or a signal to interference plus noise ratio (SINR).

In one embodiment, base station #1 and base station #2 may coordinate for joint transmission to UE with the same signal so as to improve the signal reception and communication reliability. Base station #1 and base station #2 may configure IRS #1 and IRS #2 respectively to perform data transmission with the UE. Base station #1 and base station #2 may configure IRS #1 and IRS #2 respectively to enhance quality of the reflected signal (e.g., signal on path S12 or path S22) so as to optimize the quality of superposition signals, wherein the superposition signals may include signals on path S11, signals on path S12, signals on path S21, and signals on path S22.

Base station #1 and base station #2 may coordinate for performing joint data transmission with UE by using the same data packets (i.e., data packets with same payload). In one embodiment, the same data packets may be encoded in the same format. In the other embodiment, the same data packets may be encoded in different formats respectively (e.g., via multi-input multi-output (MIMO) encoding). For example, if base station #1 transmits a first data packet to the UE directly or via IRS #1, base station #2 may transmit a second data packet to the UE directly or via IRS #2, wherein the payload of the second data packet may be the same as the payload of the first data packet. A joint encoding scheme between the base station #1 and base station #2 may enhance the reception quality or throughput of the UE. Base station #1 and base station #2 may configure IRS #1 and IRS #2 respectively to enhance the quality of the reflected signal (i.e., signals on path S12 or S22) for better signal reception.

In one embodiment, base station #1 and base station #2 may perform a coordinated scheduling for the UE. Specifically, base station #1 may transmit data packets to the UE at time T1 whereas base station #2 may transmit data packets to the UE at time T2, wherein time T2 is different from time T1. Base station #1 may configure IRS #1 to increase quality of the signal (i.e., signal transmitted from base station #1 to UE) for UE reception at time T1 and may configure IRS #1 to reduce interference (i.e., interference caused by base station #1) toward UE at time T2. Base station #2 may configure IRS #2 to increase quality of the signal (i.e., signal transmitted from base station #2 to UE) for UE reception at time T2 and may configure IRS #2 to reduce interference (i.e., interference caused by base station #2) toward UE at time T1.

In one embodiment, inter-cell operation for IRS assisted wireless network may be performed by at least one of base station #1 and base station #2. Base station #1 and base station #2 may communicate with each other via an inter-cell link, wherein the inter-cell link may connect base station #1 to base station #2, as shown in FIG. 2. The inter-cell link may be implemented by Xn interface in 5G radio access network (RAN) or by X2 interface between base stations (e.g., LTE base stations or new radio (NR) base stations).

Figure 3:
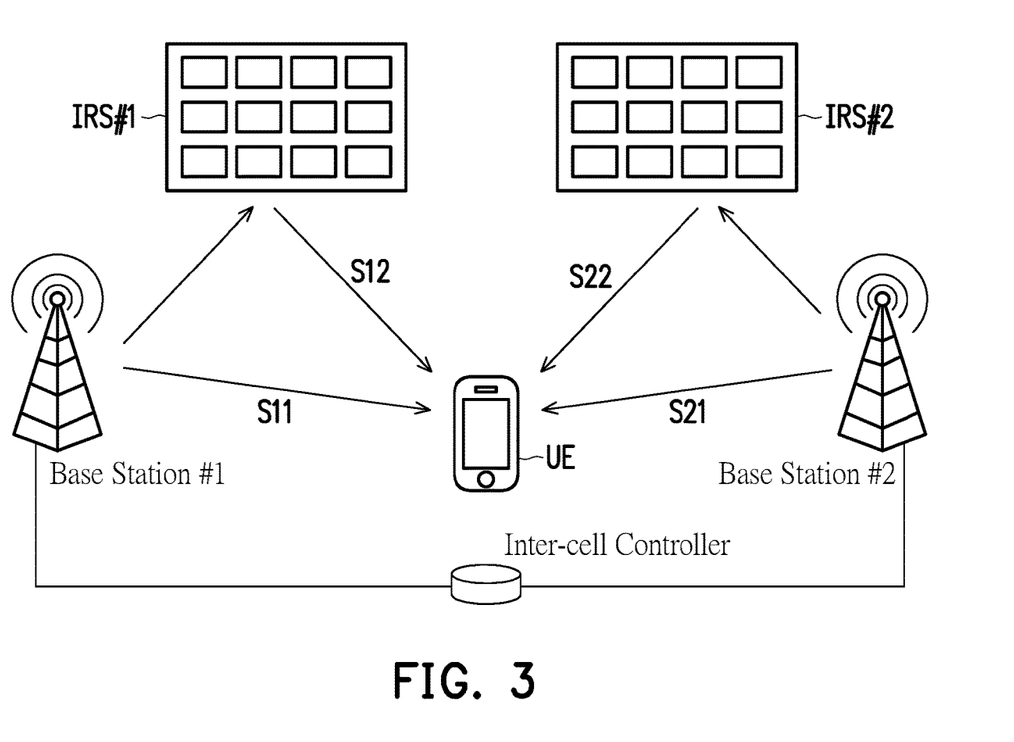
FIG. 3 illustrates a schematic diagram of an inter-cell IRS operation coordination through an inter-cell controller according to one exemplary embodiment of the present disclosure.

In one embodiment, inter-cell operation for IRS assisted wireless network may be performed by an inter-cell controller, as shown in FIG. 3. The inter-cell controller may connect base station #1 to base station #2. In one embodiment, the inter-cell controller may be disposed between base station #1 and base station #2. In one embodiment, the inter-cell controller may be disposed in base station #1 or base station #2. That is, the function of the inter-cell controller may be performed by base station #1 or base station #2. The inter-cell controller may include a server, a self-organizing network (SON) module, or a control unit for centralized RAN (C-RAN) central processing, wherein the SON module may be part of RAN controller (e.g., RAN intelligent controller in open RAN (O-RAN) architecture), co-located at base station, or part of base station.

Figure 4:
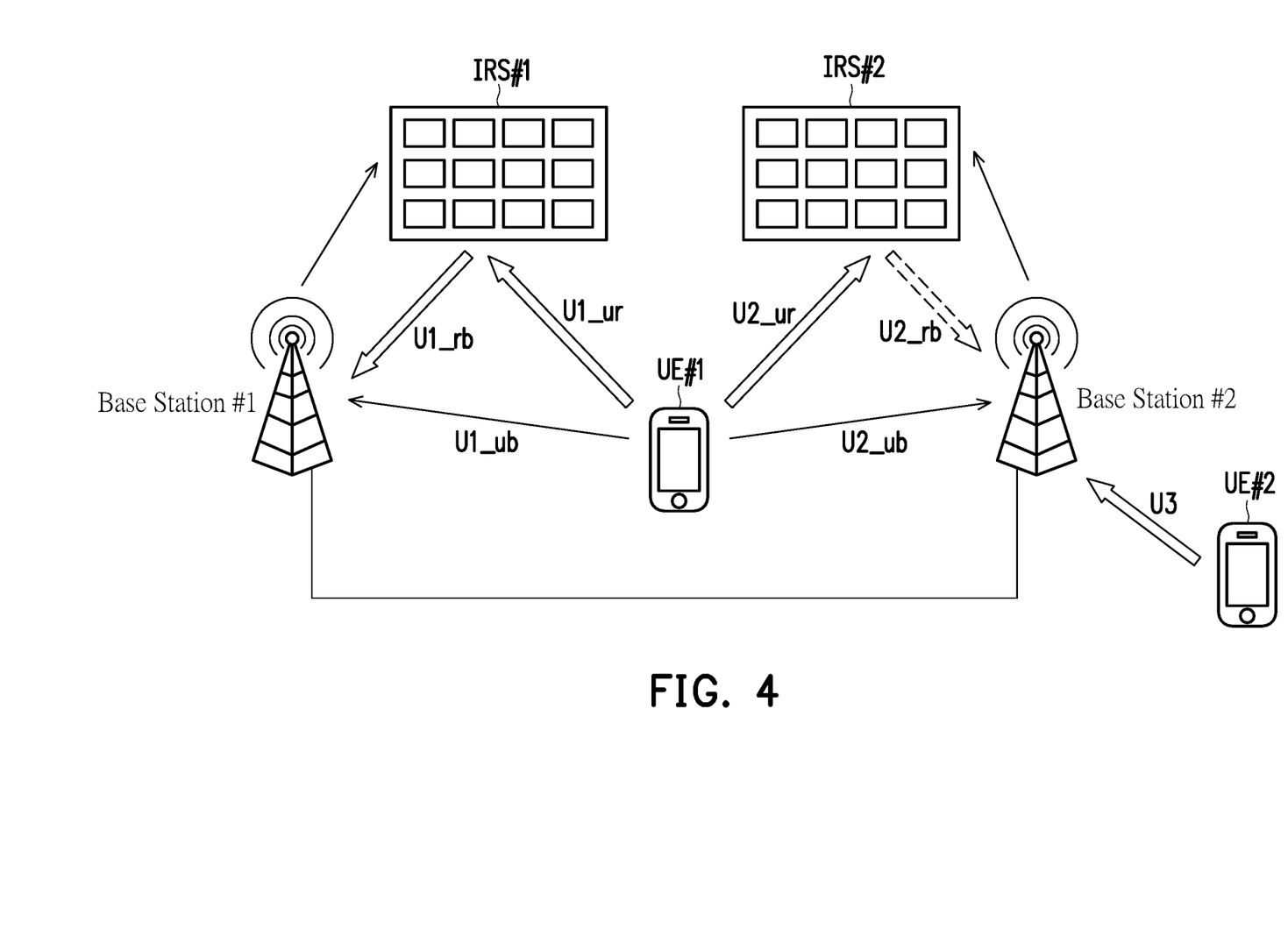
FIG. 4 illustrates a schematic diagram of multi-cell uplink transmission according to one exemplary embodiment of the present disclosure.

In inter-cell IRS assisted wireless network, a UE may perform high reliability transmissions with multiple base stations. FIG. 4 illustrates a schematic diagram of multi-cell uplink transmission according to one exemplary embodiment of the present disclosure, wherein U1_ur is a path between UE #1 and IRS #1, U1_rb is a path between IRS #1 and base station #1, U1_ub is a path between UE #1 and base station #1, U2_ur is a path between UE #1 and IRS #2, U2_rb is a path between IRS #2 and base station #2, U2_ub is a path between UE #1 and base station #2, and U3 is a path between UE #2 and base station #2.

As shown in FIG. 4, UE #1 may transmit uplink (UL) data to multiple base stations such as base station #1 and base station #2. Signals from UE #1 may propagate directly to base station #1 via path U1_ub and may propagate directly to base station #2 via path U2_ub. The transmission between the UE #1 and the base station (e.g., base station #1 or base station #2) may be improved with IRS configuration. Specifically, base station #1 may configure, by transmitted a command to IRS controller #1, IRS operation mode of IRS #1 so as to enhance the quality of the signal transmitted from UE #1 to base station #1 (e.g., signals on path U1_rb). Accordingly, the uplink reception at base station #1 may be enhanced. On the other hand, base station #2 may configure, by transmitting a command to IRS controller #2, IRS operation mode of IRS #2 so as to enhance the quality of the signal transmitted from UE #1 to base station #2 (e.g., signals U2_rb).

After receiving the data packet from the UE, the base station (e.g., base station #1 or base station #2) may decode the data packet and forward the decoded data packet to the core network or Internet. In one embodiment, base station #1 and base station #2 may independently decode the data packets received from the UE #1 and respectively forward the decoded data packets toward the core network or Internet so as to provide data packet level redundancy. In one embodiment, base station #1 and base station #2 may be coordinated for performing joint decoding on the data packets transmitted by the UE so as to generate a decoded data stream. The joint decoding may be performed by, for example, a master base station and/or other base station coordinating with the master base station. For example, the joint decoding may be performed by base station #1 and/or base station #2 coordinating with base station #1. For another example, the joint decoding may be performed by, for example, a non-BS network or a C-RAN central processing. After the decoded data stream is generated, the base station (e.g., base station #1 or base station #2) may transmit the decoded data stream to the core network or to the Internet.

In inter-cell IRS assisted wireless network, IRS may be configured to reduce inter-cell interference. As shown in FIG. 4, assuming that base station #1 is the serving base station for UE #1 and base station #2 is the serving base station for UE #2. That is, a data transmission (e.g., a UL transmission from UE #1 to base station #1) may be performed between base station #1 and UE #1 and another data transmission (e.g., a UL transmission from UE #2 to base station #2) may be performed between base station #2 and UE #2. Base station #1 may configure the IRS operation mode of IRS #1 so as to enhance the quality of the signal transmitted from UE #1 to base station #1 (e.g., signals on path U1_rb). Base station #1 may coordinate with base station #2 for IRS configurations. For example, base station #1 may send a signaling message to base station #2 via the inter-cell link so as to indicate that UE #1 might cause interference to base station #2. Base station #1 may send a signaling message to base station #2 to suggest base station #2 to configure IRS #2. Base station #2 may configure the IRS operation mode of IRS #2 to degrade the quality of the signal transmitted from UE #1 to base station #2 (e.g., reflected signal on path U2_rb). Accordingly, the UL inter-cell interference to base station #2 caused by UE #1 can be reduced. In one embodiment, base station #2 may schedule a UL data transmission between UE #2 and base station #2, wherein the UL data transmission between UE #1 and base station #1 and the UL data transmission between UE #2 and base station #2 may be performed at the same time (e.g., by using radio resource blocks corresponding to the same time).

Base station #2 may configure the IRS operation mode of IRS #2 so as to simultaneously increase the quality of UL signal from UE #2 and decrease the quality of UL signal from UE #1. For example, base station #2 may configure IRS #2 to operate in an IRS operation mode which maximizes the ratio as shown in equation (1) or equation (2), wherein "Q(X)" represents the quality (e.g., RSRP) of the signal on path X. Base station #2 may maximize equation (1) or equation (2) by degrading the quality of the signal transmitted between IRS #2 and base station #2 (i.e., signal on path U2_rb), by degrading the quality of the signal transmitted between UE #1 and base station #2 (i.e., signal on path U2_ub), or by increasing the quality of the signal transmitted between UE #2 and base station #2 (i.e., signal on path U3).

$$Q(U3)/Q(U2\_rb) \quad (1)$$

$$Q(U3)/[Q(U2\_rb)+Q(U2\_ub)] \quad (2)$$

Figure 5:
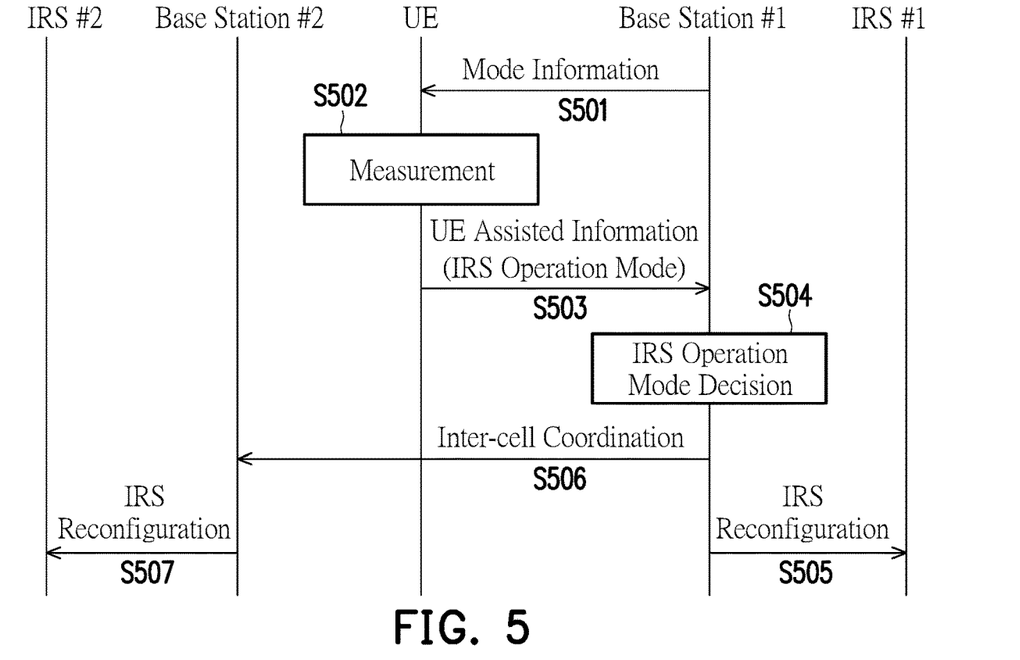
FIG. 5 illustrates a signaling flow of UE-assisted information for an inter-cell coordination of an IRS-assisted wireless network according to one exemplary embodiment of the present disclosure.

FIG. 5 illustrates a signaling flow of UE-assisted information for an inter-cell coordination of an IRS-assisted wireless network according to one exemplary embodiment of the present disclosure. It is assumed that base station #1 is the serving base station for UE and base station #2 is a neighboring base station for UE, wherein IRS #1 may be configured by base station #1 and IRS #2 may be configured by base station #2.

In step S501, UE may receive mode information from base station #1 (or base station #2), wherein the mode information may be associated with base station #1 (or IRS #1) and/or base station #2 (or IRS #2). In one embodiment, base station #1 (or base station #2) may broadcast the mode information to the UE periodically (e.g., via system information block (SIB)). In one embodiment base station #1 (or base station #2) may transmit the mode information to the UE in response to receiving a request from the UE. That is, the UE may transmit a request to base station #1 (or base station #2) for obtaining the mode information.

The mode information may be transmitted via a SIB. For example, the mode information corresponding to base station #1 (or IRS #1) may be part of an information element in SIB. For another example, the mode information corresponding to base station #2 (or IRS #2) may be part of an information element in SIB.

In one embodiment, mode information may include IRS configuration information corresponding to base station #1 or base station #2, wherein the IRS configuration information may indicate the IRS operation mode of the corresponding IRS. For example, the mode information may include an operation mode of IRS #1 or an operation mode of IRS #2.

In one embodiment, mode information may include coordinated scheduling of base station #1 and base station #2, wherein the coordinated scheduling may indicate the inter-cell IRS operation configuration information corresponding to IRS #1 and IRS #2. In one embodiment, mode information may include a list of IRS operation mode supported by base station #1 or base station #2.

In one embodiment, an IRS operation mode pattern of an IRS (e.g., IRS #1 or IRS #2) may be included in the mode information. The IRS operation mode pattern may include a plurality of IRS operation modes and a plurality of measurement period corresponding to the plurality of IRS operation modes respectively, wherein the IRS may operate in a specific IRS operation mode during the measurement period corresponding to the specific IRS operation mode. The UE may obtain the IRS operation mode of the IRS in a specific time period according to the IRS operation mode pattern.

In one embodiment, the mode information may include time and frequency of radio resource of the reference signal transmitted by base station #1 (or base station #2), wherein the reference signal may be transmitted from base station #1 (or base station #2) to UE directly or may be reflected from IRS #1 (or IRS #2) to UE. The reference signal may be used by the UE for performing channel measurement so as to generate a measurement report.

In step S502, the UE may perform channel measurement according to the mode information. For example, the UE may perform, according to the mode information, channel measurement for obtaining the channel quality of base station #1 and IRS #1 under a specific IRS operation mode, the channel quality of base station #2 and IRS #2 under a specific IRS operation mode, or the channel quality of inter-cell joint IRS operation corresponding to base station #1 and base station #2.

In step S503, the UE may transmit a measurement report including UE assisted information to base station #1, wherein the measurement report may be associated with base station #1, IRS #1, base station #2, or IRS #2. The UE assisted information may include a preference IRS operation mode of IRS #1, a preference IRS operation mode of IRS #2, a preference coordinated scheduling of base station #1 and base station #2, a first measurement result of a channel between the UE and IRS #1 operating in a specific IRS operation mode, or a second measurement result of a channel between the UE and IRS #2 operating in a specific IRS operation mode. In one embodiment, the UE assisted information may include a third measurement result of inter-cell joint IRS operation mode corresponding to IRS #1 and IRS #2, wherein the third measurement result may be derived from the first measurement result and the second measurement result by the UE.

After base station #1 receives the measurement report, in step S504, base station #1 may determine an IRS operation mode for IRS #1 according to the measurement report so as to generate an IRS reconfiguration (or IRS configuration). In one embodiment, base station #1 may determine a suggested IRS operation mode for IRS #2 according to the measurement report so as to generate an inter-cell coordination configuration.

To increase the communication reliability, the preference coordinated scheduling included in the measurement report may suggest that base station #1 and base station #2 perform data transmission with the UE respectively by using the same data packets (i.e., data packets with same payload). Accordingly, IRS #1 and IRS #2 may reflect the same data packets respectively to the UE.

To increase the communication data rate, the preference coordinated scheduling included in the measurement report may suggested that base station #1 and base station #2 perform data transmission with the UE respectively by using different data packets (i.e., data packets with different payloads). Accordingly, IRS #1 and IRS #2 may reflect different data packets respectively to the UE. In one embodiment, base station #1 (or base station #2) may decode the different data packets to generate a decoded data stream. Base station #1 (or base station #2) may transmit the decoded data stream to a core network or to the Internet.

In step S505, base station #1 may transmit the IRS reconfiguration to IRS #1 so as to reconfigure (or configure) the IRS operation mode of IRS #1. Base station #1 may reconfigure (or configure) IRS #1 via an indication corresponding to a specific IRS operation mode or via a dynamic pattern (i.e., IRS operation mode pattern of IRS #1). IRS #1 may be configured to enhance or degrade the quality of the signal transmitted between IRS #1 and the UE.

In step S506, base station #1 may transmit the inter-cell coordination configuration to a neighboring base station such as base station #2, wherein the inter-cell coordination configuration may include, for example, a suggested operation mode of IRS #2, a suggested coordinated scheduling of base station #1 and base station #2, or the measurement report received from the UE.

In step S507, base station #2 may transmit an IRS reconfiguration (or IRS configuration) to IRS #2 according to the inter-cell coordination configuration so as to reconfigure (or configure) the IRS operation mode of IRS #2. Base station #2 may reconfigure (or configure) IRS #2 via an indication corresponding to a specific IRS operation mode or via a dynamic pattern (i.e., IRS operation mode pattern of IRS #2). IRS #2 may be configured to enhance or degrade the quality of the signal transmitted between IRS #2 and the UE. After the configuration for IRS #1 and IRS #2 are completed, the UE may perform data transmission with base station #1 via IRS #1 and perform data transmission with base station #2 via IRS #2.

Figure 6:
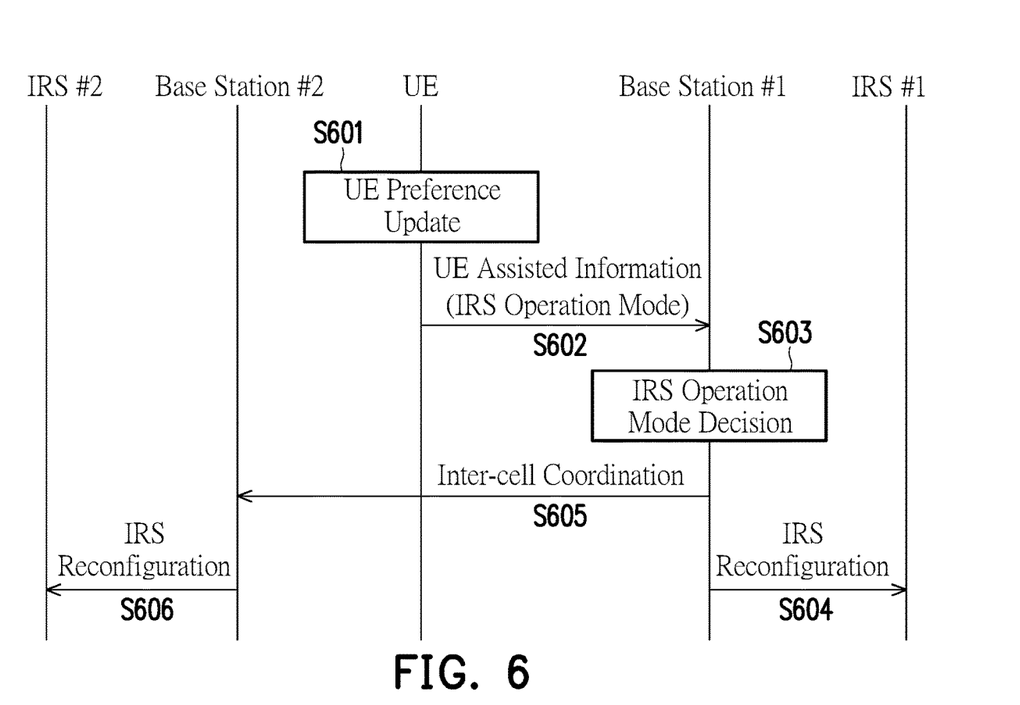
FIG. 6 illustrates a signaling flow of IRS operation mode reconfiguration with UE preference change according to one exemplary embodiment of the present disclosure.

FIG. 6 illustrates a signaling flow of IRS operation mode reconfiguration with UE preference change according to one exemplary embodiment of the present disclosure. It is assumed that base station #1 is the serving base station for UE and base station #2 is a neighboring base station for UE, wherein IRS #1 may be configured by base station #1 and IRS #2 may be configured by base station #2.

In step S601, the UE may update UE preference associated with IRS operation modes of an IRS (e.g., IRS #1 or IRS #2) or schemes of inter-cell IRS operations corresponding to the serving base station (i.e., base station #1) and neighboring base station (i.e., base station #2). The UE may generate a measurement report according to the updated UE preference. For example, the measurement report may include a preference coordinated scheduling corresponding to base station #1 and base station #2. The UE may generate the preference coordinated scheduling according to the selected scheme of inter-cell IRS operations.

In one embodiment, the UE may select the scheme of the inter-cell IRS operation or may change the selection of the inter-cell IRS operation. The UE may trigger the selection of the scheme of the inter-cell IRS operation in response to receiving a command from a base station (e.g., base station #1 or base station #2). The UE may change the serving base station of the UE to a neighboring base station (or target base station) operates in a preference IRS operation mode or a neighboring base station (or target base station) supports the preference IRS operation mode. During the handover procedure, the UE may indicate the preference IRS operation mode to the target base station. The selection of the scheme of the inter-cell IRS operation may be initiated in response to one or more criteria being met, wherein the one or more criteria may include: a channel quality of IRS assisted serving base station becomes better than a threshold; a channel quality of IRS assisted serving base station becomes worse than a threshold; a difference of channel quality between the IRS assisted neighboring base station and the IRS assisted serving base station becomes better than a threshold; a channel quality of IRS assisted neighboring base station becomes better than a threshold; a channel quality of IRS assisted neighboring base station becomes worse than a threshold; or an interference from the neighboring base station becomes greater than a threshold.

In step S602, the UE may transmit the measurement report including UE assisted information to base station #1. The UE assisted information may include a preference IRS operation mode of IRS #1, a preference IRS operation mode of IRS #2, a preference coordinated scheduling of base station #1 and base station #2, a first measurement result of a channel between the UE and IRS #1 operating in a specific IRS operation mode, or a second measurement result of a channel between the UE and IRS #2 operating in a specific IRS operation mode. In one embodiment, the UE assisted information may include a third measurement result of inter-cell joint IRS operation mode corresponding to IRS #1 and IRS #2, wherein the third measurement result may be derived from the first measurement result and the second measurement result by the UE or base station #1.

The UE may determine to transmit the measurement report to the base station #1 according to a trigger event. In one embodiment, the UE may transmit the measurement report to base station #1 if the UE changes the requirement of communication reliability or communication data rate. For example, in response to detecting interference caused by base station #2 or IRS #2, the UE may update the requirement of communication reliability between the UE and the base station #1 (or IRS #1). Thus, the UE may determine to transmit the measurement report to base station #1. For anther example, in response to detecting an increase in the data rate requirement, the UE may determine to transmit the measurement report to base station #1. In one embodiment, the UE may obtain a measurement result by performing the channel measurement, and the UE may determine to transmit the measurement report to base station #1 according to the measurement result, wherein the measurement result may be associated with, for example, communication reliability or communication data rate. The UE may determine to transmit the measurement report to base station #1 in response to the measurement result being less than a threshold. For example, the UE may determine to transmit the measurement repot to base station #1 in response to the communication reliability or the communication data rate being less than the threshold.

After base station #1 receives the measurement report, in step S603, base station #1 may determine an IRS operation mode for IRS #1 according to the measurement report so as to generate an IRS reconfiguration (or IRS configuration). In one embodiment, base station #1 may determine a suggested IRS operation mode for IRS #2 according to the measurement report so as to generate an inter-cell coordination configuration.

To increase the communication reliability, the suggested coordinated scheduling included in the measurement report may suggest that base station #1 and base station #2 perform data transmission with the UE respectively by using the same data packets (i.e., data packets with same payload). Accordingly, IRS #1 and IRS #2 may reflect the same data packets respectively to the UE.

To increase the communication data rate, the suggested coordinated scheduling included in the measurement report may suggested that base station #1 and base station #2 perform data transmission with the UE respectively by using different data packets (i.e., data packets with different payloads). Accordingly, IRS #1 and IRS #2 may reflect different data packets respectively to the UE. In one embodiment, base station #1 (or base station #2) may decode the different data packets to generate a decoded data stream. Base station #1 (or base station #2) may transmit the decoded data stream to a core network or to the Internet.

In step S604, base station #1 may transmit the IRS reconfiguration to IRS #1 so as to reconfigure (or configure) the IRS operation mode of IRS #1. Base station #1 may reconfigure (or configure) IRS #1 via an indication corresponding to a specific IRS operation mode or via a dynamic pattern (i.e., IRS operation mode pattern of IRS #1). IRS #1 may be configured to enhance or degrade the quality of the signal transmitted between IRS #1 and the UE.

In step S605, base station #1 may transmit the inter-cell coordination configuration to base station #2, wherein the inter-cell coordination configuration may include, for example, a suggested operation mode of IRS #2, a suggested coordinated scheduling of base station #1 and base station #2, or the measurement report received from the UE.

In step S606, base station #2 may transmit an IRS reconfiguration (or IRS configuration) to IRS #2 according to the inter-cell coordination configuration so as to reconfigure (or configure) the IRS operation mode of IRS #2. Base station #2 may reconfigure (or configure) IRS #2 via an indication corresponding to a specific IRS operation mode or via a dynamic pattern (i.e., IRS operation mode pattern of IRS #2). IRS #2 may be configured to enhance or degrade the quality of the signal transmitted between IRS #2 and the UE. After the configuration for IRS #1 and IRS #2 are completed, the UE may perform data transmission with base station #1 via IRS #1 and perform data transmission with base station #2 via IRS #2.

Figure 7:
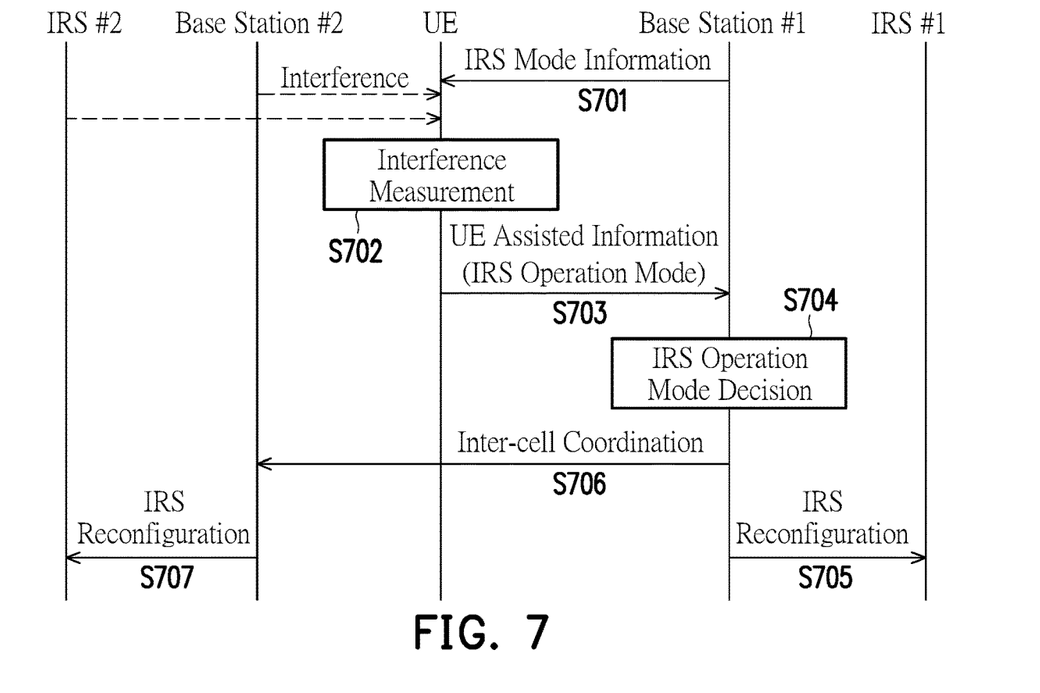
FIG. 7 illustrates a signaling flow of IRS operation mode reconfiguration with neighboring interference detection according to one exemplary embodiment of the present disclosure.

FIG. 7 illustrates a signaling flow of IRS operation mode reconfiguration with neighboring interference detection according to one exemplary embodiment of the present disclosure. It is assumed that base station #1 is the serving base station for UE and base station #2 is a neighboring base station for UE, wherein IRS #1 may be configured by base station #1 and IRS #2 may be configured by base station #2.

In step S701, UE may receive mode information from base station #1 (or base station #2), wherein the mode information may be associated with base station #2 (or IRS #2). In one embodiment, base station #1 (or base station #2) may broadcast the mode information to the UE periodically (e.g., via system information block (SIB)). In one embodiment base station #1 (or base station #2) may transmit the mode information to the UE in response to receiving a request from the UE. That is, the UE may transmit a request to base station #1 (or base station #2) for obtaining the mode information.

In step S702, the UE may measure interference level caused by base station #2 (i.e., neighboring base station) and IRS #2. In one embodiment, the UE may measure interference levels respectively corresponding to different IRS operation modes of IRS #2.

In step S703, the UE may transmit a measurement report including UE assisted information to base station #1 so as to complain about the interference caused by base station #2 or IRS #2, wherein the measurement report may be generated by the UE according to the measurement result(s) of the interference levels. The UE assisted information may include a preference IRS operation mode of IRS #2, a preference coordinated scheduling of base station #1 and base station #2, or the measurement result(s).

After base station #1 receives the measurement report, in step S704, base station #1 may determine an IRS operation mode for IRS #1 according to the measurement report (i.e., the preference IRS operation mode of IRS #2) so as to generate an IRS reconfiguration (or IRS configuration) On the other hand, base station #1 may determine a suggested IRS operation mode for IRS #2 according to the measurement report so as to generate an inter-cell coordination configuration.

In step S705, base station #1 may transmit the IRS reconfiguration to IRS #1 so as to reconfigure (or configure) the IRS operation mode of IRS #1. Base station #1 may reconfigure (or configure) IRS #1 via an indication corresponding to a specific IRS operation mode or via a dynamic pattern (i.e., IRS operation mode pattern of IRS #1). IRS #1 may be configured to enhance the quality of the signal transmitted between IRS #1 and the UE.

In step S706, base station #1 may transmit the inter-cell coordination configuration to a neighboring base station such as base station #2, wherein the inter-cell coordination configuration may include, for example, a suggested operation mode of IRS #2, a suggested coordinated scheduling of base station #1 and base station #2, or the measurement report received from the UE.

In step S707, base station #2 may transmit an IRS reconfiguration (or IRS configuration) to IRS #2 according to the inter-cell coordination configuration so as to reconfigure (or configure) the IRS operation mode of IRS #2. Base station #2 may reconfigure (or configure) IRS #2 via an indication corresponding to a specific IRS operation mode or via a dynamic pattern (i.e., IRS operation mode pattern of IRS #2). IRS #2 may be configured to degrade the quality of the signal transmitted between IRS #2 and the UE. After the configuration for IRS #1 and IRS #2 are completed, the UE may perform data transmission with base station #1 via IRS #1 and perform data transmission with base station #2 via IRS #2.

Figure 8:
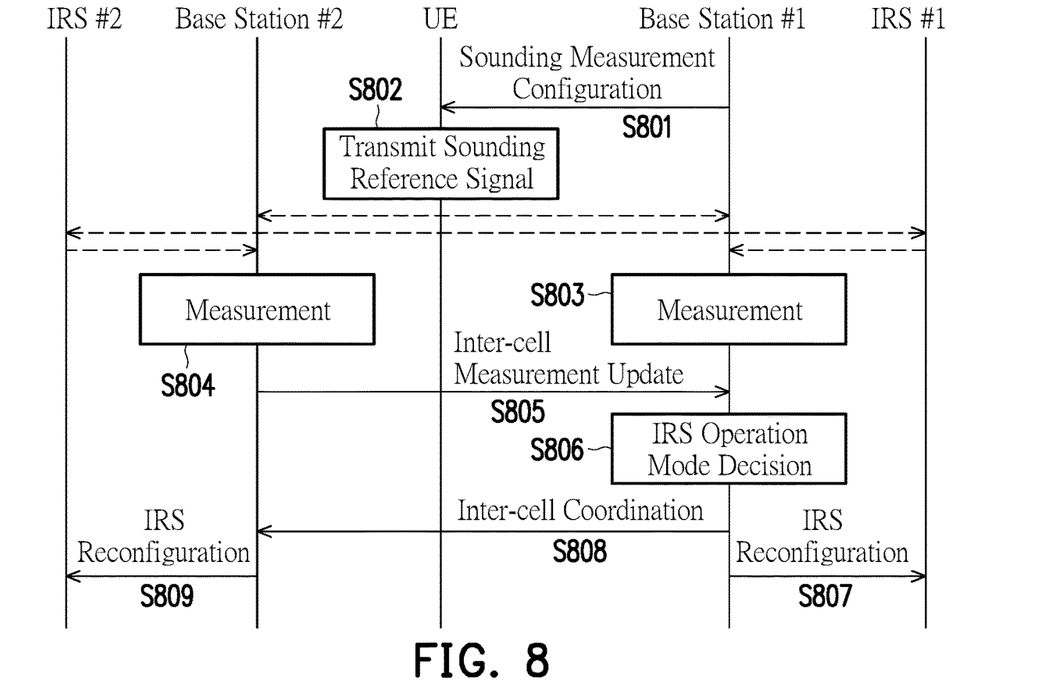
FIG. 8 illustrates a signaling flow of uplink sounding channel measurement for inter-cell IRS reconfiguration according to one exemplary embodiment of the present disclosure.

FIG. 8 illustrates a signaling flow of uplink sounding channel measurement for inter-cell IRS reconfiguration according to one exemplary embodiment of the present disclosure. It is assumed that base station #1 is the serving base station for UE and base station #2 is a neighboring base station for UE, wherein IRS #1 may be configured by base station #1 and IRS #2 may be configured by base station #2.

In step S801, the UE may receive sounding measurement configuration from base station #1 (or base station #2). The sounding measurement configuration may correspond to at least one of IRS #1 and IRS #2. The sounding measurement configuration may include, for example, an IRS operation mode (or IRS operation pattern) of IRS #1, an IRS operation mode (or IRS operation pattern) of IRS #2, or a UL time and frequency of radio resource for transmitting a sounding reference signal (SRS). The sounding measurement configuration may be transmitted via s SIB. In one embodiment, base station #1 (or base station #2) may transmit the sounding measurement configuration to the UE in response to receiving a request from the UE. That is, the UE may transmit a request to base station #1 (or base station #2) for obtaining the sounding measurement configuration.

In step S802, the UE may transmit a sounding reference signal according to the sounding measurement configuration, wherein the sounding reference signal may be transmitted to base station #1 directly from the UE or the sounding reference signal may be reflected to base station #1 by IRS #1, wherein the sounding reference signal may be transmitted to base station #2 directly from the UE or the sounding reference signal may be reflected to base station #2 by IRS #2. In one embodiment, the UE may transmit the sounding reference signal by a one-time action according to the time and frequency of radio resource. In one embodiment, the UE may transmit the sounding reference signal periodically according to the time and frequency of radio resource. In one embodiment, the UE may transmit the sounding reference signal semi-persistently according to the sounding measurement configuration. For example, the sounding measurement configuration may indicate parameters for transmitting the sounding reference signal semi-persistently, wherein the parameters may include the number of transmissions to be performed and/or a time period between the performing of two transmissions.

In step S803, base station #1 may perform a channel measurement according to the sounding reference signal and generate a measurement report (also refer to as "first measurement report") associated with the reception of the sounding reference signal. In step S804, base station #2 may perform a channel measurement according to the sounding reference signal and generate a measurement report (also refer to as "second measurement report") associated with the reception of the sounding reference signal. In step S805, base station #2 may transmit the second measurement report to base station #1 for updating the inter-cell measurement. The second measurement report may include, for example, a preference operation mode of IRS #2, a preference coordinated scheduling of base station #1 and base station #2, or a measurement result (e.g., RSRP, RSSI, RSRQ, or SINR RSRP) of the channel between the UE and base station #2 or the channel between the UE and IRS #2.

After base station #1 receives the second measurement report from base station #2, in step S806, base station #1 may determine an IRS operation mode for IRS #1 according to the first measurement report and/or the second measurement report so as to generate an IRS reconfiguration (or IRS configuration). On the other hand, base station #1 may generate an inter-cell coordination configuration according to the first measurement report and/or the second measurement report, wherein the inter-cell coordination configuration may include, for example, a suggested IRS operation mode of IRS #2, a suggested coordinated scheduling of base station #1 and base station #2, or the first measurement report.

To increase the communication reliability, the suggested coordinated scheduling included in the inter-cell coordination configuration may suggest that base station #1 and base station #2 perform data transmission with the UE respectively by using the same data packets (i.e., data packets with same payload). Accordingly, IRS #1 and IRS #2 may reflect the same data packets respectively to the UE.

To increase the communication data rate, the suggested coordinated scheduling included in the inter-cell coordination configuration may suggest that base station #1 and base station #2 perform data transmission with the UE respectively by using different data packets (i.e., data packets with different payloads). Accordingly, IRS #1 and IRS #2 may reflect different data packets respectively to the UE. In one embodiment, base station #1 (or base station #2) may decode the different data packets to generate a decoded data stream. Base station #1 (or base station #2) may transmit the decoded data stream to a core network or to the Internet.

In step S807, base station #1 may transmit the IRS reconfiguration to IRS #1 so as to reconfigure (or configure) the IRS operation mode of IRS #1. Base station #1 may reconfigure (or configure) IRS #1 via an indication corresponding to a specific IRS operation mode or via a dynamic pattern (i.e., IRS operation mode pattern of IRS #1). IRS #1 may be configured to enhance or degrade the quality of the signal transmitted between IRS #1 and the UE.

In step S808, base station #1 may transmit the inter-cell coordination configuration to base station #2. In step S809, base station #2 may transmit an IRS reconfiguration (or IRS configuration) to IRS #2 according to the inter-cell coordination configuration so as to reconfigure (or configure) the IRS operation mode of IRS #2. Base station #2 may reconfigure (or configure) IRS #2 via an indication corresponding to a specific IRS operation mode or via a dynamic pattern (i.e., IRS operation mode pattern of IRS #2). IRS #2 may be configured to enhance or degrade the quality of the signal transmitted between IRS #2 and the UE. After the configuration for IRS #1 and IRS #2 are completed, the UE may perform data transmission with base station #1 via IRS #1 and perform data transmission with base station #2 via IRS #2.

Figure 9:
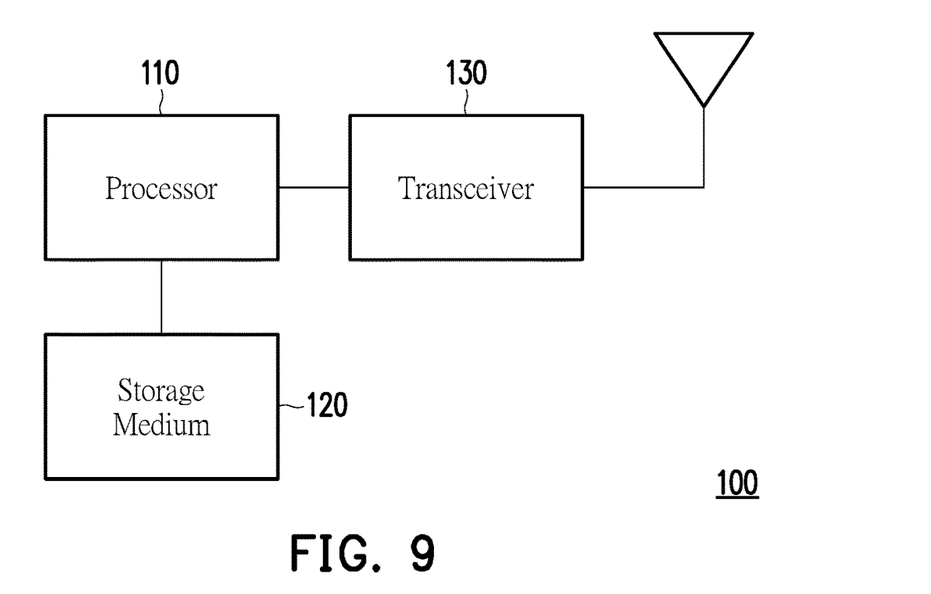
FIG. 9 illustrates a schematic diagram of a UE according to one exemplary embodiment of the present disclosure.

FIG. 9 illustrates a schematic diagram of a UE according to one exemplary embodiment of the present disclosure. The UE 100 may include a processor 110, a storage medium 120, and a transceiver 130. The processor 110 is coupled to the storage medium 120 and the transceiver 130 and is configured to at least to implement the method as described in FIGS. 1-8 as well as its exemplary embodiment and alternative variations.

The processor 110 could be implemented by using programmable units such as a microprocessor, a micro-controller, a DSP chips, FPGA, etc. The functions of the processor 110 may also be implemented with separate electronic devices or ICs. It should be noted that the functions of processor 110 may be implemented with either hardware or software.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110.

The transceiver 130 may be configured to transmit and receive signals respectively in the radio frequency or in the mmWave frequency. The transceiver 130 may also perform operations such as low noise amplifying, impedance matching, frequency mixing, up or down frequency conversion, filtering, amplifying, and so forth. The transceiver 130 may include one or more digital-to-analog (D/A) converters or analog-to-digital (A/D) converters which are configured to convert from an analog signal format to a digital signal format during uplink signal processing and from a digital signal format to an analog signal format during downlink signal processing. The transceiver 130 may include an antenna array which may include one or multiple antennas to transmit and receive omni-directional antenna beams or directional antenna beams.

Figure 10:
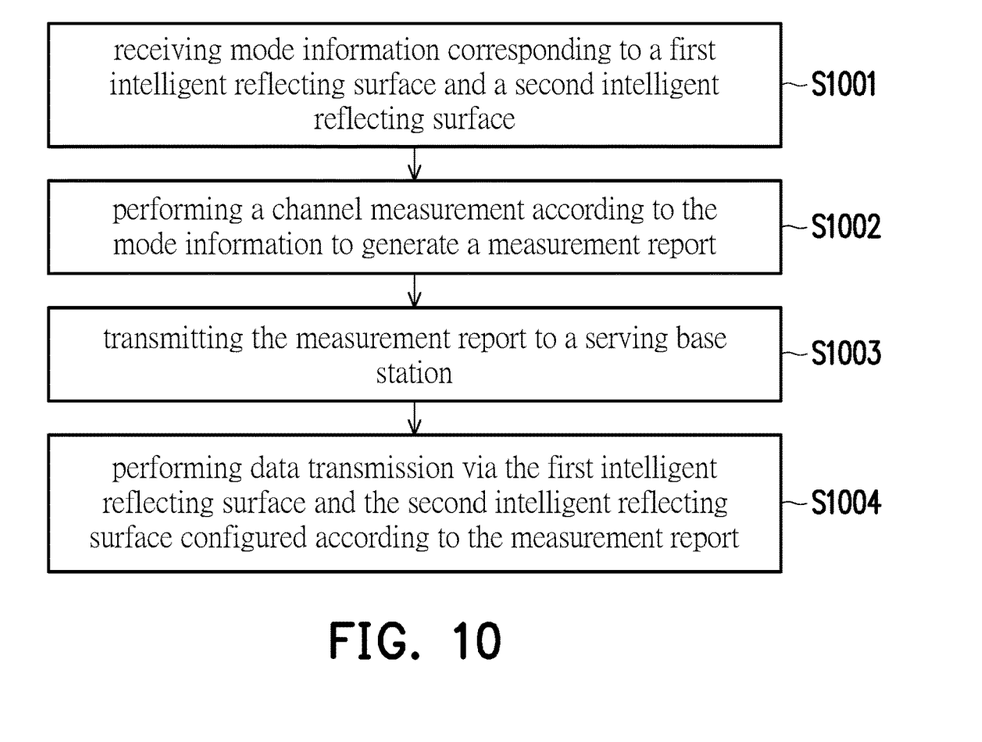
FIG. 10 illustrates a flowchart of a method of inter-cell coordination for IRS assisted wireless network adapted to a UE according to one exemplary embodiment of the present disclosure.

FIG. 10 illustrates a flowchart of a method of inter-cell coordination for IRS assisted wireless network adapted to a UE according to one exemplary embodiment of the present disclosure, wherein the method may be implemented by UE 100 as shown in FIG. 9. In step S1001, receiving mode information corresponding to a first intelligent reflecting surface and a second intelligent reflecting surface. In step S1002, performing a channel measurement according to the mode information to generate a measurement report. In step S1003, transmitting the measurement report to a serving base station. In step S1004, performing data transmission via the first intelligent reflecting surface and the second intelligent reflecting surface configured according to the measurement report.

Figure 11:
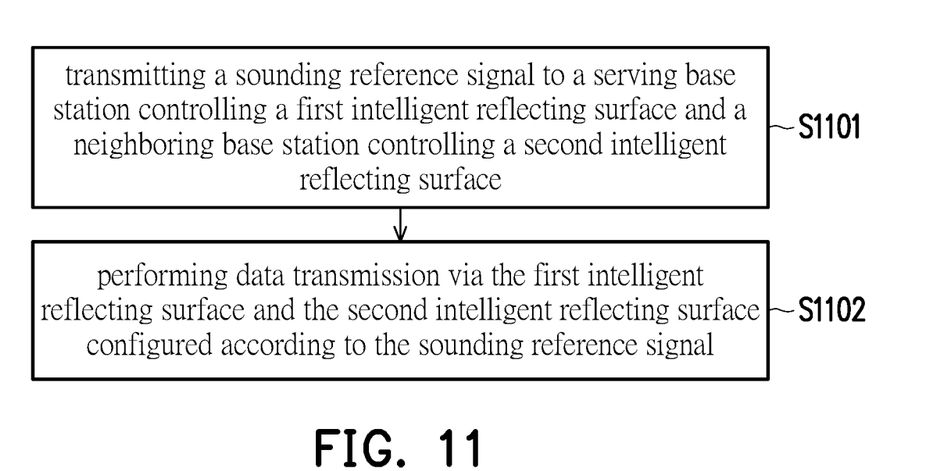
FIG. 11 illustrates a flowchart of a method of inter-cell coordination for IRS assisted wireless network adapted to a UE according to another one exemplary embodiment of the present disclosure.

FIG. 11 illustrates a flowchart of a method of inter-cell coordination for IRS assisted wireless network adapted to a UE according to another one exemplary embodiment of the present disclosure, wherein the method may be implemented by UE 100 as shown in FIG. 9. In step S1101, transmitting a sounding reference signal to a serving base station controlling a first intelligent reflecting surface and a neighboring base station controlling a second intelligent reflecting surface. In step S1102, performing data transmission via the first intelligent reflecting surface and the second intelligent reflecting surface configured according to the sounding reference signal.

Figure 12:
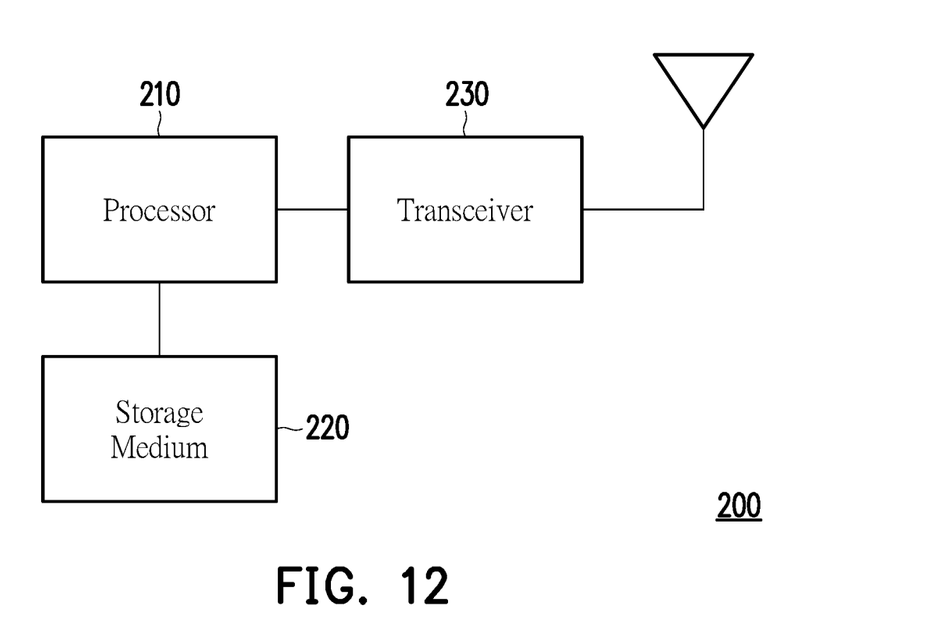
FIG. 12 illustrates a schematic diagram of a base station according to one exemplary embodiment of the present disclosure.

FIG. 12 illustrates a schematic diagram of a base station according to one exemplary embodiment of the present disclosure. The base station 200 may include a processor 210, a storage medium 220, and a transceiver 230. The processor 210 is coupled to the storage medium 220 and the transceiver 230 and is configured to at least to implement the method as described in FIGS. 1-8 as well as its exemplary embodiment and alternative variations.

The processor 210 could be implemented by using programmable units such as a microprocessor, a micro-controller, a DSP chips, FPGA, etc. The functions of the processor 210 may also be implemented with separate electronic devices or ICs. It should be noted that the functions of processor 210 may be implemented with either hardware or software.

The storage medium 220 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 210.

The transceiver 230 may be configured to transmit and receive signals respectively in the radio frequency or in the mmWave frequency. The transceiver 230 may also perform operations such as low noise amplifying, impedance matching, frequency mixing, up or down frequency conversion, filtering, amplifying, and so forth. The transceiver 230 may include one or more digital-to-analog (D/A) converters or analog-to-digital (A/D) converters which are configured to convert from an analog signal format to a digital signal format during uplink signal processing and from a digital signal format to an analog signal format during downlink signal processing. The transceiver 230 may include an antenna array which may include one or multiple antennas to transmit and receive omni-directional antenna beams or directional antenna beams.

Figure 13:
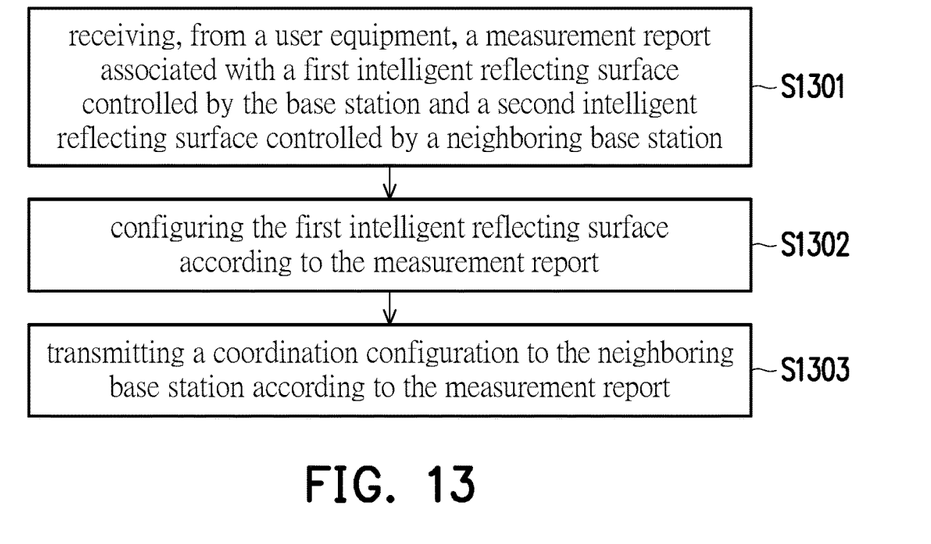
FIG. 13 illustrates a flowchart of a method of inter-cell coordination for IRS assisted wireless network adapted to a base station according to one exemplary embodiment of the present disclosure.

FIG. 13 illustrates a flowchart of a method of inter-cell coordination for IRS assisted wireless network adapted to a base station according to one exemplary embodiment of the present disclosure, wherein the method may be implemented by base station 200 as shown in FIG. 12. In step S1301, receiving, from a user equipment, a measurement report associated with a first intelligent reflecting surface controlled by the base station and a second intelligent reflecting surface controlled by a neighboring base station. In step S1302, configuring the first intelligent reflecting surface according to the measurement report. In step S1303, transmitting a coordination configuration to the neighboring base station according to the measurement report.

Figure 14:
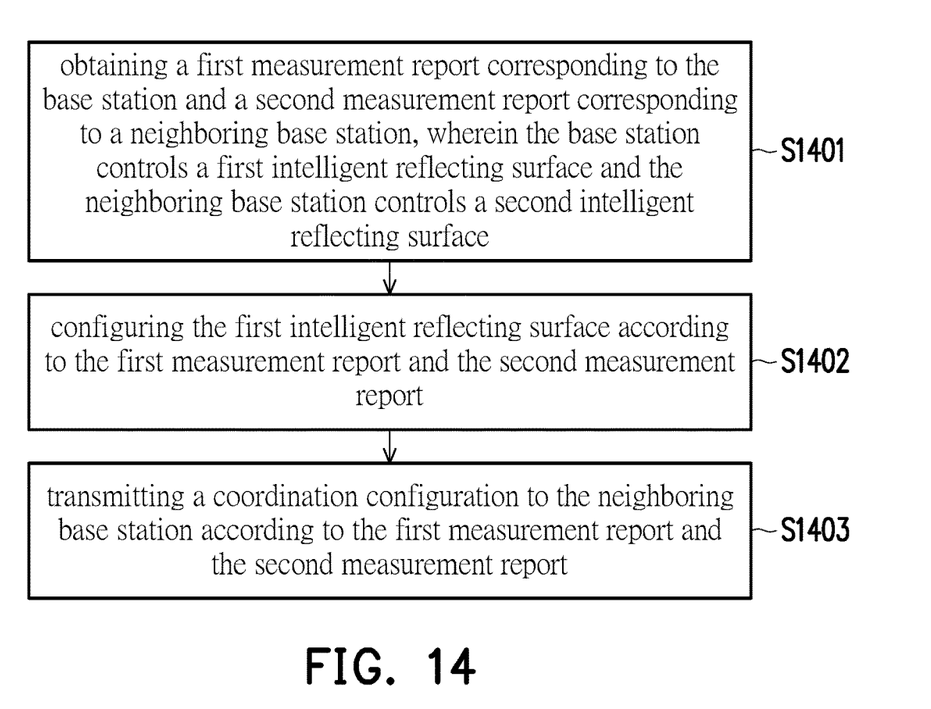
FIG. 14 illustrates a flowchart of a method of inter-cell coordination for IRS assisted wireless network adapted to a base station according to another one exemplary embodiment of the present disclosure.

FIG. 14 illustrates a flowchart of a method of inter-cell coordination for IRS assisted wireless network adapted to a base station according to another one exemplary embodiment of the present disclosure, wherein the method may be implemented by base station 200 as shown in FIG. 12. In step S1401, obtaining a first measurement report corresponding to the base station and a second measurement report corresponding to a neighboring base station, wherein the base station controls a first intelligent reflecting surface and the neighboring base station controls a second intelligent reflecting surface. In step S1402, configuring the first intelligent reflecting surface according to the first measurement report and the second measurement report. In step S1403, transmitting a coordination configuration to the neighboring base station according to the first measurement report and the second measurement report.

Based on the above, the present disclosure provides a wireless communication mechanism with IRS configuring and inter-cell coordination. IRS may be applied to the wireless network to enhance wireless signal reception or reduce interference. Signal reception and interference for the UE in the cell boundary are critical for performance of wireless communication. With inter-cell coordination, performance of the cell-edge UE may be improved. With both IRS configuring and inter-cell coordination, different IRS operation modes may be configured to provide better quality for wireless communication.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of inter-cell coordination for intelligent reflecting surface assisted wireless network, adapted to a user equipment, comprising:
   receiving mode information corresponding to a first intelligent reflecting surface and a second intelligent reflecting surface;
   performing a channel measurement according to the mode information to generate a measurement report;
   transmitting the measurement report to a serving base station;
   performing data transmission via the first intelligent reflecting surface and the second intelligent reflecting surface configured according to the measurement report;
   when detecting interference caused by a first neighboring base station corresponding to the second intelligent reflecting surface, determining to transmit the measurement report; and when a measurement result of the channel measurement is less than a threshold, determining to transmit the measurement report.

2. The method of claim 1, wherein the measurement report comprises at least one of the followings:
- a first preference operation mode of the first intelligent reflecting surface, wherein the first intelligent reflecting surface is controlled by the serving base station;
- a second preference operation mode of the second intelligent reflecting surface, wherein the second intelligent reflecting surface is controlled by the first neighboring base station;
- a preference coordinated scheduling of the serving base station controlling the first intelligent reflecting surface and the first neighboring base station controlling the second intelligent reflecting surface;
- a first measurement result of a first channel between the user equipment and the first intelligent reflecting surface; and
- a second measurement result of a second channel between the user equipment and the second intelligent reflecting surface.

3. The method of claim 1, wherein the mode information comprises at least one of the followings:
- a first operation mode of the first intelligent reflecting surface;
- a second operation mode of the second intelligent reflecting surface;
- a coordinated scheduling of the serving base station corresponding to the first intelligent reflecting surface and the first neighboring base station corresponding to the second intelligent reflecting surface;
- a list of operation modes supported by the serving base station or the first neighboring base station; and
- a time and frequency of radio resource of a reference signal for performing the channel measurement.

4. The method of claim 1, wherein the measurement result is associated with a communication reliability, wherein a preference coordinated scheduling in the measurement report suggests that the serving base station controlling the first intelligent reflecting surface and a second neighboring base station controlling the second intelligent reflecting surface perform the data transmission with the user equipment respectively by using the same data packets.

5. The method of claim 1, wherein the measurement result is associated with a communication data rate, wherein a preference coordinated scheduling in the measurement report suggests that the serving base station controlling the first intelligent reflecting surface and a second neighboring base station controlling the second intelligent reflecting surface perform the data transmission with the user equipment respectively by using different data packets.

6. The method of claim 1, wherein the mode information is received from one of the serving base station controlling the first intelligent reflecting surface and the first neighboring base station controlling the second intelligent reflecting surface.

* * * * *